(12) United States Patent
Shiba

(10) Patent No.: US 11,125,857 B2
(45) Date of Patent: Sep. 21, 2021

(54) MOVING OBJECT DETECTION SYSTEM AND MOVING OBJECT DETECTION METHOD

(71) Applicant: NEC Corporation, Tokyo (JP)

(72) Inventor: Hisashi Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 323 days.

(21) Appl. No.: 16/040,674

(22) Filed: Jul. 20, 2018

(65) Prior Publication Data
US 2019/0025419 A1    Jan. 24, 2019

(30) Foreign Application Priority Data

Jul. 24, 2017  (JP) .............................. JP2017-142459

(51) Int. Cl.
*G01S 7/35* (2006.01)
*G01S 13/00* (2006.01)
(Continued)

(52) U.S. Cl.
CPC .............. *G01S 7/354* (2013.01); *G01S 7/536* (2013.01); *G01S 13/003* (2013.01);
(Continued)

(58) Field of Classification Search
CPC ........ G01S 13/56; G01S 13/003; G01S 7/354; G01S 7/536; G01S 13/343; G01S 15/586;
(Continued)

(56) References Cited

U.S. PATENT DOCUMENTS

| 5,396,253 A * | 3/1995 | Chia ....................... G01S 11/06 342/104 |
| 6,879,920 B2 * | 4/2005 | Peng ......................... G01P 3/50 342/450 |

(Continued)

FOREIGN PATENT DOCUMENTS

| CN | 106100692 A | 11/2016 |
| CN | 106330251 A | 1/2017 |

(Continued)

OTHER PUBLICATIONS

Japanese Office Action for JP Application No. 2017-142459 dated Apr. 20, 2021 with English Translation.
(Continued)

*Primary Examiner* — Vladimir Magloire
*Assistant Examiner* — Alexander L. Syrkin
(74) *Attorney, Agent, or Firm* — Sughrue Mion, PLLC

(57) ABSTRACT

A moving object detection system comprises: a transmission waveform setting section to set a transmission signal in such a way that a frequency of the transmission signal is linearly changed; a transmitting section to transmit the transmission signal; a receiving section to receive a reception signal resulting from a reflection of the transmission signal at an object; a Doppler coefficient estimating section to estimate a Doppler coefficient associated with a movement of the object by performing arithmetic processing on a waveform of the reception signal at a present time point and waveforms of the reception signal at one or more past time points, the one or more past time points being earlier than the present time point by one or more specified periods of time; and an object detection section to detect the object based on the transmission signal, the Doppler coefficient, and the reception signal.

11 Claims, 12 Drawing Sheets

(51) Int. Cl.
*G01S 7/536* (2006.01)
*G01S 15/58* (2006.01)
*G01S 13/58* (2006.01)
*G01S 15/34* (2006.01)

(52) U.S. Cl.
CPC ............ *G01S 13/584* (2013.01); *G01S 15/34* (2013.01); *G01S 15/586* (2013.01)

(58) Field of Classification Search
CPC ........ G01S 13/584; G01S 15/34; G01S 13/53; G01S 15/003
USPC .......................................................... 342/28
See application file for complete search history.

(56) References Cited

U.S. PATENT DOCUMENTS

| | | | | |
|---|---|---|---|---|
| 7,107,056 | B2* | 9/2006 | Peng | G01S 11/026 375/148 |
| 7,505,864 | B2* | 3/2009 | Sundaralingam | G01S 11/10 455/441 |
| 10,126,417 | B2* | 11/2018 | Shikatani | G01S 13/723 |
| 10,502,824 | B2* | 12/2019 | Roger | G01S 7/35 |
| 2004/0075605 | A1 | 4/2004 | Bradford et al. | |
| 2004/0082331 | A1 | 4/2004 | Peng | |
| 2005/0225481 | A1* | 10/2005 | Bonthron | G01S 13/282 342/175 |
| 2006/0220946 | A1* | 10/2006 | Nohmi | G01S 13/536 342/107 |
| 2010/0216406 | A1* | 8/2010 | Park | H04B 7/01 455/67.11 |
| 2011/0221628 | A1* | 9/2011 | Kamo | G01S 7/295 342/70 |
| 2013/0050013 | A1* | 2/2013 | Kobayashi | H03L 7/093 342/118 |
| 2014/0333478 | A1* | 11/2014 | Andre | G01S 19/28 342/357.67 |
| 2015/0247924 | A1* | 9/2015 | Kishigami | G01S 13/931 342/70 |
| 2015/0331096 | A1* | 11/2015 | Schoor | G01S 13/584 342/112 |
| 2016/0018511 | A1* | 1/2016 | Nayyar | G01S 13/878 342/27 |
| 2016/0124075 | A1* | 5/2016 | Vogt | G01S 13/325 342/13 |
| 2017/0082744 | A1* | 3/2017 | Matsumoto | G01S 13/584 |
| 2017/0123059 | A1* | 5/2017 | Asanuma | G01S 7/354 |
| 2017/0131392 | A1* | 5/2017 | Schoor | G01S 13/34 |
| 2017/0131394 | A1* | 5/2017 | Roger | G01S 7/023 |
| 2017/0131396 | A1* | 5/2017 | Schoor | G01S 13/583 |
| 2017/0192088 | A1* | 7/2017 | Fluhler | G01S 7/2922 |
| 2017/0254893 | A1* | 9/2017 | Evans | G01S 13/726 |
| 2018/0172815 | A1* | 6/2018 | Mckitterick | G01S 13/343 |
| 2018/0203105 | A1* | 7/2018 | Kuehnle | G01S 7/354 |
| 2018/0348339 | A1* | 12/2018 | Lien | G01S 7/023 |
| 2018/0348340 | A1* | 12/2018 | Lien | G01S 13/581 |
| 2018/0348353 | A1* | 12/2018 | Lien | H01Q 3/40 |
| 2019/0011549 | A1* | 1/2019 | Mercuri | G01S 13/726 |
| 2019/0101617 | A1* | 4/2019 | Kishigami | G01S 7/292 |
| 2019/0195999 | A1* | 6/2019 | Shiba | G01S 13/56 |

FOREIGN PATENT DOCUMENTS

| | | |
|---|---|---|
| JP | H02-165087 A | 6/1990 |
| JP | H11-234190 A | 8/1999 |
| JP | 2005-517190 A | 6/2005 |
| JP | 2015-172510 A | 10/2015 |
| JP | 2017106748 A * | 6/2017 |

OTHER PUBLICATIONS

Japanese Office Action for JP Application No. 2017-142459 dated Jul. 6, 2021 with English Translation.

* cited by examiner

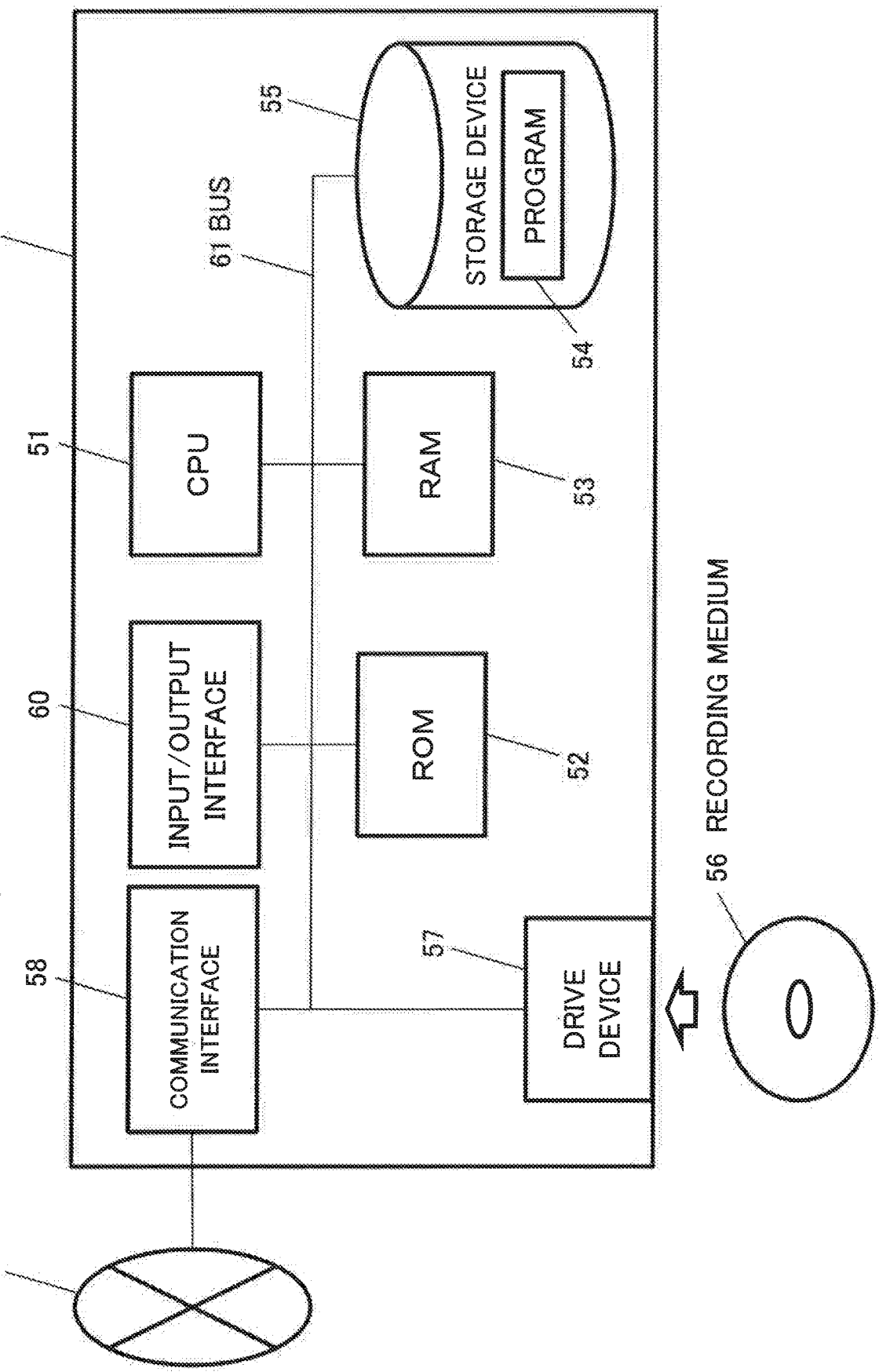

MOVING OBJECT DETECTION SYSTEM AND MOVING OBJECT DETECTION METHOD

This application is based upon and claims the benefit of priority from Japanese Patent Application No. 2017-142459, filed on Jul. 24, 2017, the disclosure of which is incorporated herein in its entirety by reference.

TECHNICAL FIELD

The present invention relates to moving object detection systems and moving object detection methods and, more particularly, to a moving object detection system and a moving object detection method that use a transmission wave whose frequency is linearly changed.

BACKGROUND ART

A moving object detection system that uses a transmission wave whose frequency is linearly changed is disclosed in, for example, Japanese Unexamined Patent Application Publication (Translation of PCT Application) No. 2005-517190) (patent document 1).

A radar apparatus disclosed in patent document 1 allows a mixer to mix a string of rectangular pulses each having a pulse width T and a coherent signal having a frequency fcoho, and allows a pulse stretcher to apply a frequency modulation of a bandwidth Δf to a resulting mixed signal and thereby generate a string of linear frequency modulated pulses. Further, the radar apparatus predicts a Doppler shift fdt, which is a Doppler shift due to the movement of a target object, in advance; sets the frequency of a basic stabilized-local-oscillator (STALO) signal having an initial frequency fo to a frequency (fo−fdt), this fdt being a frequency offset to be given to a transmission radio wave in advance; frequency-converts the string of modulated pulses, which is output from the pulse stretcher, into a string of pulses having a carrier frequency (fo−fdt); and emits the frequency-converted string of pulses into the air as the transmission radio wave. This transmission radio wave is reflected at the object, and the Doppler shift fdt, which occurs along with the movement of the object, is added to the frequency of a reception radio wave resulting from the reflection of the transmission radio wave at the object. In this case, the added Doppler shift fdt is offset by the frequency offset fdt, which has been given to the transmission radio wave in advance, and as a result, the reception radio wave whose frequency has become the initial frequency fo is subjected to a reception process. Namely, in patent document 1, there is disclosed such a technique as to allow the reception radio wave, which is received as the result of predicting the Doppler shift fdt due to the movement of the object in advance and frequency-converting and transmitting the transmission radio wave, to be subjected to the reception process in a form equivalent to a form for a reception radio wave to which the Doppler shift fdt due to the movement of the object is not added. The technique disclosed in patent document 1, however, is on the assumption that the velocity of the target object can be predicted in advance, and thus, in the case where an object having an unknown velocity is a detection target, the detection of such an object is difficult.

A technique that enables the detection of an object having an unknown velocity is disclosed in, for example, Japanese Unexamined Patent Application Publication No. 2015-172510 (patent document 2). A moving object detection system disclosed in patent document 2 simultaneously transmits a waveform having an increasing frequency and a waveform having a decreasing frequency. The moving object detection system disclosed in patent document 2 calculates a beat frequency fb by adding (V/C)×Df to the result of averaging an up-chirp beat frequency fb(up) and a down-chirp beat frequency fb(dn), and calculates an object distance R[n] by dividing the result of multiplying an acoustic velocity C with the beat frequency Fb by 2α. Here, V is the velocity of the object, and Df is the difference between known center frequencies of an up-chirp wave and a down-chirp wave. Further, α indicates a frequency change, and when the pulse length of a transmission signal is denoted by T and the amplitude of the frequency of the transmission signal is denoted by B, α is represented by B/T.

Even when the object moves at a constant velocity, a portion depending on time remains in the beat frequency. As described above, the moving object detection system disclosed in patent document 2 calculates the beat frequency fb by adding (V/C)×Df to the result of averaging the up-chirp beat frequency fb(up) and the down-chirp beat frequency fb(dn), and calculates the object distance R[n] by dividing the result of multiplying the acoustic velocity C with the beat frequency Fb by 2α. Accordingly, in such a calculation method disclosed in patent document 2, as a result, the calculation is performed on the basis an approximation in which there is no portion depending on time in the beat frequency, and thus, strictly, error arises.

SUMMARY

An objective of the present invention is to improve accuracy in measurement of distance to an object and velocity of the object in a moving object detection system and a moving object detection method that use a transmission wave whose frequency is modulated linearly.

A moving object detection system according to an aspect of the present invention comprises: at least one hardware processor comprising: a transmission waveform setting section configured to set a transmission signal in such a way that a frequency of the transmission signal is linearly changed; a transmitting section configured to transmit the transmission signal; a receiving section configured to receive a reception signal resulting from a reflection of the transmission signal at an object; a Doppler coefficient estimating section configured to estimate a Doppler coefficient associated with a movement of the object by performing arithmetic processing on a waveform of the reception signal at a present time point and waveforms of the reception signal at one or more past time points, the one or more past time points being earlier than the present time point by one or more specified periods of time; and an object detection section configured to detect the object based on the transmission signal, the Doppler coefficient, and the reception signal.

A moving object detection method according to another aspect of the present invention comprises: setting a transmission signal whose frequency is linearly changed; receiving a reception signal resulting from a reflection of the transmission signal at an object; estimating a Doppler coefficient associated with a movement of the object by performing arithmetic processing on a waveform of the reception signal at a present time point and waveforms of the reception signal at one or more past time points, the one or more past time points being earlier than the present time point by one or more specified periods of time; and detecting the object based on the transmission signal, the Doppler coefficient, and the reception signal.

A non-transitory computer-readable recording medium according to still another aspect of the present invention stores a program causing a computer to execute: a process of setting a transmission signal whose frequency is linearly changed; a process of receiving a reception signal resulting from a reflection of the transmission signal at an object; a process of estimating a Doppler coefficient associated with a movement of the object by performing arithmetic processing on a waveform of the reception signal at a present time point and waveforms of the reception signals at one or more past time points, the one or more past time points being earlier than the present time point by one or more specified periods of time; and a process of detecting the object based on the transmission signal, the Doppler coefficient, and the reception signal.

BRIEF DESCRIPTION OF THE DRAWINGS

FIG. 12 is a diagram illustrating an example of the configuration of a computer that implements each of sections of each of the exemplary embodiments.

EXEMPLARY EMBODIMENT

Next, exemplary embodiments of the present invention will be described in detail with reference to the drawings.

Figure 1:
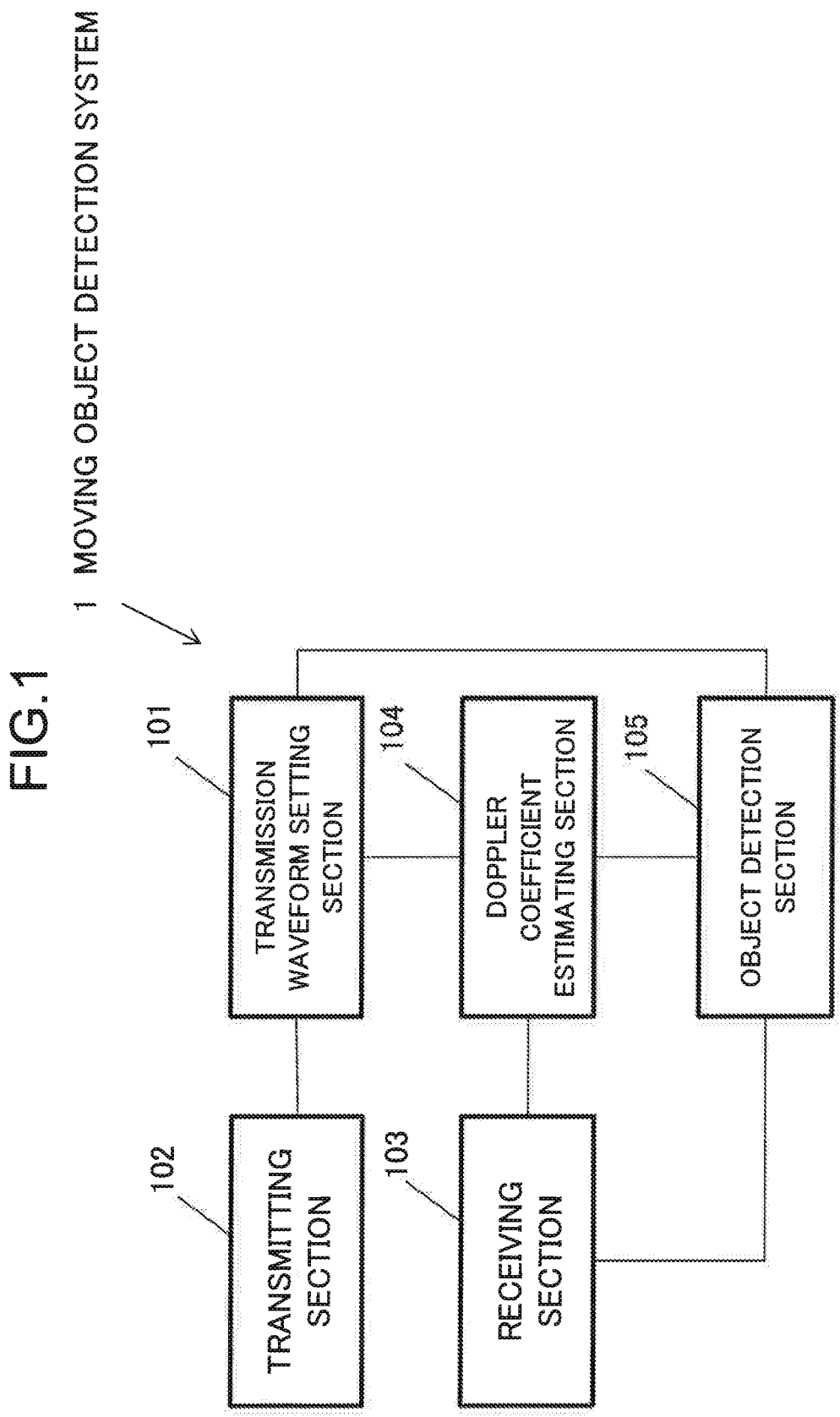
FIG. 1 is a block diagram illustrating a configuration of a first exemplary embodiment.

FIG. 1 is a block diagram illustrating a configuration of a first exemplary embodiment. As illustrated in FIG. 1, a moving object detection system 1 according to the first exemplary embodiment, includes a transmission waveform setting section 101, a transmitting section 102, a receiving section 103, a Doppler coefficient estimating section 104, and an object detection section 105.

The transmission waveform setting section 101 sets a transmission signal whose frequency is linearly changed. For example, the transmission waveform setting section 101 performs setting in such a way that a waveform St(t) at a time point t ranging from 0 to L is represented by the following formula (1).

$$S_t(t) = B \cdot \exp\left(j\omega t + \frac{j\mu t^2}{2}\right) \quad (1)$$

Figure 2:
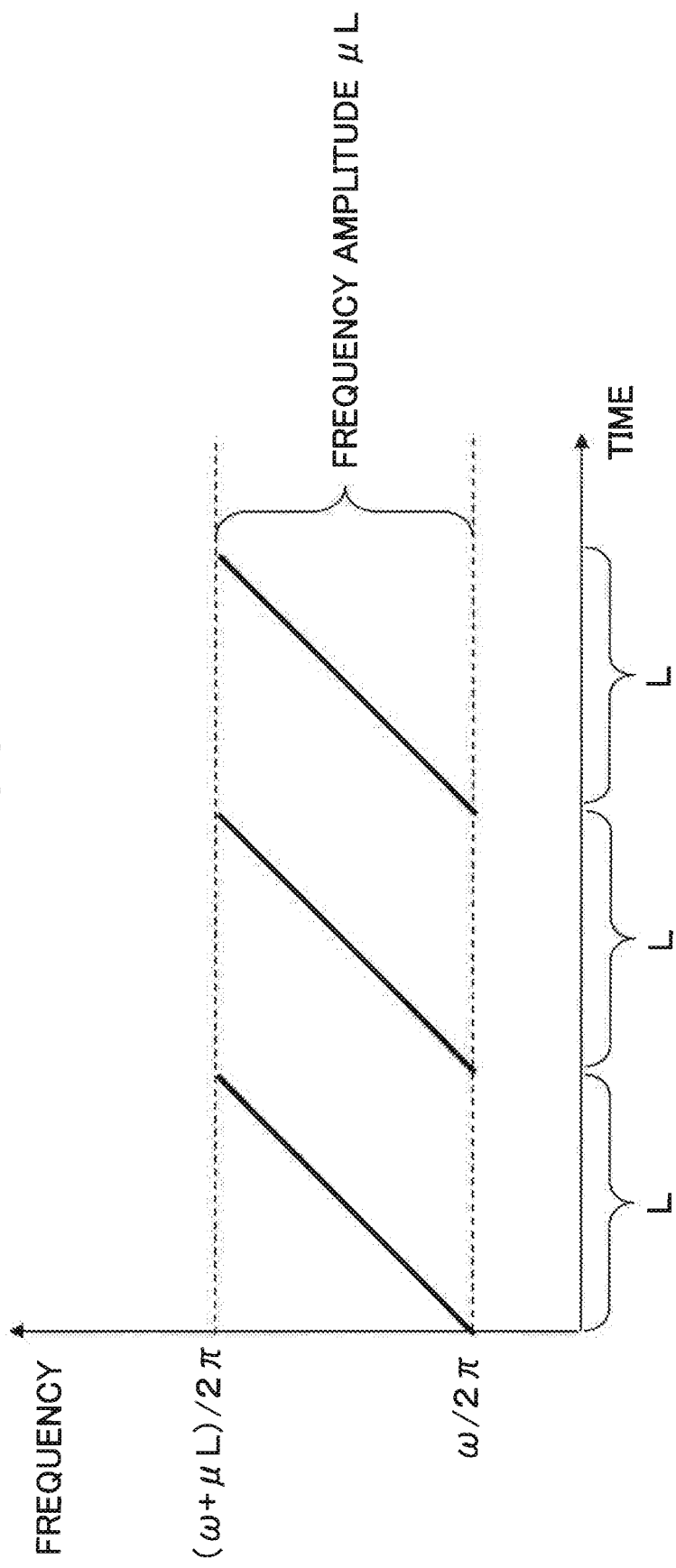
FIG. 2 is a diagram illustrating an example of the frequency change of a transmission signal.

FIG. 2 is a diagram illustrating an example of the frequency change of the transmission signal. In an example represented by the formula (1), as illustrated in FIG. 2, the setting of the transmission signal is performed such that its angular frequency is ($\omega+\mu t$) at a time point t; becomes $\omega$ at t="0"; is linearly increased therefrom and becomes ($\omega+\mu L$) at t=L; and its frequency change is periodically repeated with a repetition cycle L. Although, in FIG. 2, there is illustrated an example in which the frequency is linearly increased, the setting of the transmission signal is not limited to this example, and may be performed such that the frequency is linearly decreased.

The transmitting section 102 transmits the transmission signal having been set by the transmission waveform setting section 101. The transmitting section 102 is constituted by, for example, an electric circuit for converting a digital electric signal into an analog electric signal, and a transmitter device. For example, in the case of a sonar, the transmitting section 102 includes a wave transceiver that converts an analog electric signal into an acoustic wave, and an acoustic wave is transmitted from the wave transceiver into the sea after the electric circuit converts a transmission waveform stored in the transmission waveform setting section 101 into an analog electric signal. For example, in the case of a radar, the transmitting section 102 includes an antenna, and a radio wave is transmitted into the air from the antenna after the electric circuit converts a transmission waveform stored in the transmission waveform setting section 101 into an analog electric signal.

In the case where there exists a moving object that is a target of detection, the receiving section 103 receives a reception signal resulting from the reflection of the transmission signal having been transmitted from the transmitting section 102 at the object. The receiving section 103 is constituted by, for example, a receiver device, and an electric circuit for converting an analog signal output from the receiving component into a digital electric signal (hereinafter referred to as the reception signal). For example, in the case of the sonar, the receiving section 103 includes a wave transceiver that converts an acoustic wave from the sea into an analog signal. In the receiving section 103, the wave transceiver receives acoustic waves including an acoustic wave resulting from the reflection of the acoustic wave having been transmitted from the transmitting section 102 at the object, and converts the received acoustic waves into an analog electric signal, and the electric circuit converts the analog electric signal into a digital electric signal and outputs the converted digital electric signal. For example, in the case of the radar, the receiving section 103 includes an antenna. The antenna receives a radio wave and converts the received radio wave into an analog electric signal, and the electric circuit converts the analog electric signal into a digital electric signal and outputs the converted digital electric signal.

When a period of time from the transmission of the transmission signal by the transmitting section 102 until the reception, by the receiving section 103, of a reception signal resulting from the reflection of the transmission signal at the object is denoted by $t_0$ and a Doppler shift coefficient is denoted by $\eta$, because of the Doppler effect, a waveform $S_r(t)$ of the reception signal becomes a waveform represented by a formula obtained by replacing t of the formula (1) by $\eta(t-t_0)$. The waveform $S_r(t)$ of the reception wave can be represented by, for example, the following formula (2).

$$S_r(t) = A\sqrt{\eta} \exp\left\{ j\omega \cdot \eta(t-t_0) + \frac{j\mu \cdot \eta^2(t-t_0)^2}{2} \right\} \quad (2)$$

Here, the Doppler shift coefficient (Doppler coefficient)$_{11}$ is defined by the following formula (3).

$$\eta = \frac{c+v_s}{c+v_o} \cdot \frac{c-v_o}{c-v_s} \quad (3)$$

Here, $v_s$ is a velocity component of a sensor in a direction in which an object is moving, and is denoted by a plus sign in the case where the direction of this velocity component of the sensor corresponds to a direction in which the sensor approaches the object. Further, $v_o$ is a velocity component of the object in a direction in which the sensor is moving, and is denoted by a plus sign in the case where the direction of this velocity component of the object corresponds to a direction in which the object is moving away from the sensor.

Figure 3:
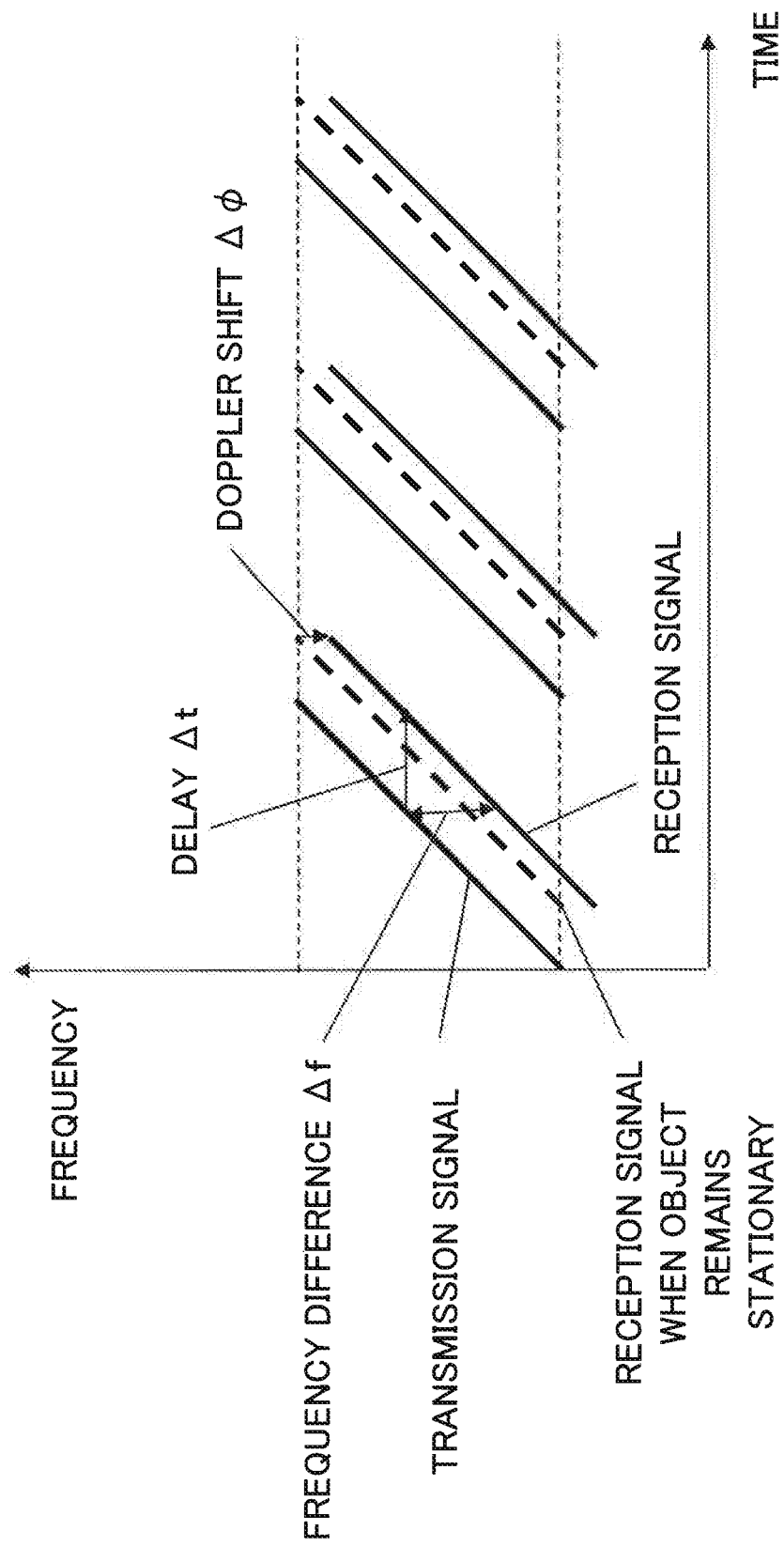
FIG. 3 is a diagram illustrating an example of the frequency changes of a transmission signal and a reception signal in the case where an object is moving at a constant velocity in a separating direction.

FIG. 3 is a diagram illustrating an example of the frequency changes of a transmission signal and a reception signal in the case where an object is moving at a constant velocity in a direction in which the object is moving away from a sensor. As illustrated in FIG. 3, in the case where an object is moving at a constant velocity in a direction in which the object is moving away from the moving object detection system 1, because of the Doppler effect, the frequency of the reception signal reflected from the object becomes lower than the frequency of a reception signal in the case where the object remains stationary by, for example, $\Delta\varphi$. The reception signal is received by the receiving section 103. Thus, as illustrated in FIG. 3, a frequency difference $\Delta f$ at the same time point becomes larger compared with the case where the reception signal is received when the object is stationary. In other words, a delay $\Delta t$, which is a delay time until the frequency of the reception signal becomes the same as the frequency of the transmission signal, becomes large. For this reason, calculating a distance to a moving object using the same method as that for calculating a distance to an object remaining stationary causes error.

Note that, in FIG. 3, the frequency difference $\Delta f$ and the delay $\Delta t$ vary with time, and the straight line of the transmission signal and the straight line of the reception signal are not in parallel to each other. According to the formula (1), the angular frequency of the transmission signal at a time point t is $(\omega+\mu t)$, and according to the formula (2), an angular frequency $\omega(t)$ of the reception signal at the time point t, is $(\omega\eta+\mu\eta^2(t-t_0))$, and thus, when the frequency difference for the transmission wave and the reception wave is represented by an angular frequency difference $\Delta\omega$, the angular frequency difference $\Delta\omega$ can be represented by the following formula (4).

$$\Delta\omega = \omega \cdot (\eta-1) + \mu \cdot (\eta^2-1)t - \mu\eta^2 t_0 \quad (4)$$

As shown in the formula (4), even when both of the velocity of the object and the velocity of the sensor are constant, a portion depending on time remains in the frequency difference for the transmission wave and the reception wave. Since the straight line of the transmission signal and the straight line of the reception signal are not in parallel to each other, the delay $\Delta t$, which is a delay time until the frequency of the reception signal becomes the same as the frequency of the transmission signal, also varies with time.

The Doppler coefficient estimating section 104 estimates the Doppler coefficient $\eta$ associated with the movement of the object by performing arithmetic processing on a waveform of the reception signal at a present time point and waveforms of the reception signals at one or more past time points that are earlier than the present time point by one or more specified periods of time. For a method of calculating the Doppler coefficient some methods, such as ones described later in other exemplary embodiments, can be considered, and one example thereof will be described below. For example, the Doppler coefficient estimating section 104 calculates a complex conjugate of, for example, a waveform $S_r(t-t_A)$, which is a waveform of the reception signal at a past time point earlier than a present time point by a specified period of time $t_A$, which is externally specified; multiplies the calculated complex conjugate and a waveform $S_r(t)$, which is a waveform of the reception signal at the present time point, to calculate a multiplied signal; and calculates the Doppler coefficient $\eta$ associated with the movement of the object on the basis of the calculated, multiplied signal.

For example, when the reception signal at the present time point is assumed to be represented by the above formula (2), a reception signal having been received earlier than the present time point by the specified period of time $t_A$ can be represented by the following formula (5).

$$S_r(t-t_A) = A\sqrt{\eta} \exp\left\{ j\omega \cdot \eta(t-t_A-t_0) + \frac{j\mu \cdot \eta^2(t-t_A-t_0)^2}{2} \right\} \quad (5)$$

Note that, when a period of time required for the change of the frequency of the reception signal from its minimum frequency to its maximum frequency or from its maximum frequency to its minimum frequency is denoted by L', the specified period of time $t_A$ satisfies an inequality, $0 < t_A \leq L'$.

The Doppler coefficient estimating section 104 calculates the product of the waveform $S_r(t)$ of the reception signal at the present time and the complex conjugate of the waveform $S_r(t-t_A)$ of the reception signal at the past time point earlier than the present time point by the specified period of time $t_A$. A waveform $S_r(t) \cdot S_r^*(t-t_A)$, which is the waveform of a multiplied signal that is the product of the present signal represented by the formula (2) and the complex conjugate of the past signal having been received earlier than the present time point by the specified period of time $t_A$ and represented by the formula (5), can be represented by the following formula (6).

$$S_r \cdot S_r^*(t-t_A) = |A|^2 \eta \exp\left\{ j\omega \cdot \eta t_A + \frac{j\mu \cdot \eta^2(2t_A t - 2t_A t_0 - t_A^2)}{2} \right\} \quad (6)$$

According to the formula (6), an element depending on time in the phase of the waveform $S_r(t) \cdot S_r^*(t-t_A)$ of the multiplied signal is $\mu \cdot \eta^2 t_A t$. Accordingly, the multiplied signal forms a wave having an angular frequency whose absolute value is represented by $|\mu \cdot \eta^2 t_A|$ and is constant. According to the above study, the Doppler coefficient estimating section 104 can calculate the Doppler coefficient η by analyzing the frequency spectrum of the multiplied signal, which is the product of the present signal and the complex conjugate of the past signal having been received earlier than the present time point by the specified period of time $t_A$, to obtain a frequency absolute value |f|; obtaining μ from the transmission waveform setting section 101; and substituting the obtained frequency absolute value |f| and μ, and the specified period of time $t_A$ into the following formula (7).

$$\eta = \sqrt{\frac{2\pi|f|}{|\mu t_A|}} \tag{7}$$

The object detection section 105 detects the object on the basis of the transmission signal, the Doppler coefficient η, and the reception signal. Specifically, the object detection section 105 detects the distance to the object and the velocity of the object on the basis of the transmission signal, the Doppler coefficient and the reception signal. For a method of calculating the distance to the object and the velocity of the object, some methods can be considered, and one example thereof will be described below.

First, the object detection section 105 obtains the velocity $v_o$, which is the velocity of the object, by substituting the Doppler coefficient η and the velocity $v_s$, which is the known velocity of the sensor, into the following formula (8) that is obtained by transforming the formula (3).

$$v_0 = \frac{c(c+v_s) - \eta c(c-v_s)}{c+v_s + \eta(c-v_s)} \tag{8}$$

Further, in order to obtain the distance to the object, the object detection section 105 obtains a period of time $t_o$, which is a period of time from a time point when the transmitting section 102 transmits the transmission signal until a time point when the receiving section 103 receives the reception signal resulting from the reflection of the transmission signal at the object. For example, first, the object detection section 105 generates a transmission waveform by transforming the transmission waveform St (t), which is stored in the transmission waveform setting section 101, on the basis of the Doppler coefficient which is estimated by the Doppler coefficient estimating section 104, (the generated transmission waveform being referred to as a transformed transmission waveform), that is, specifically, the object detection section 105 generates a transformed transmission waveform by allowing the frequency of the transmission signal to be shifted by the Doppler coefficient η. Namely, the transformed transmission waveform is a waveform resulting from replacing t of the transmission waveform St(t) by ηt. In the case where the transmission waveform St(t) is set in such a way as to be represented by the above formula (1), the object detection section 105 generates a transformed transmission waveform St'(t) in such a way that this transformed transmission waveform St'(t) is represented by the following formula (9).

$$S_t'^{(t)} = B \cdot \exp\left(j\omega\eta t + \frac{j\mu\eta^2 t^2}{2}\right) \tag{9}$$

Further, the object detection section 105 obtains the waveform of a multiplied signal resulting from multiplying the transformed transmission waveform St'(t) by a complex conjugate Sr*(t), which is the complex conjugate of the reception waveform Sr(t). For example, when the transformed transmission waveform St'(t) is represented by the formula (9) and the reception waveform Sr(t) is represented by the formula (2), a waveform Sr*(t)St'(t), which is the waveform of the multiplied signal, is represented by the following formula (10).

$$S_r^*(t)S_t'(t) = A^* \sqrt{\eta}\, B\exp\left\{j\omega \cdot \eta t_0 + \frac{j\mu \cdot \eta^2 (2t_0 t - t_0^2)}{2}\right\} \tag{10}$$

It can be understood from the formula (10) that the absolute value of the angular frequency of the waveform Sr*(t)St'(t) of the multiplied signal becomes |μ·η²$t_0$|. Thus, the object detection section 105 analyzes the frequency spectrum of the multiplied signal to obtain a frequency absolute value |f|. Moreover, the object detection section 105 acquires μ from the transmission waveform setting section 101; acquires η from the Doppler coefficient estimating section 104; and calculates the period of time $t_0$ using the following formula (11).

$$|f| = \frac{|\mu \cdot \eta^2 t_0|}{2\pi} \tag{11}$$

In the case where the transmitting section 102 and the receiving section 103 are located at the same place, the period of time $t_0$ is a round-trip time of the wave to/from the object, and thus, the object detection section 105 calculates $ct_0/2$ to obtain the distance to the object. When an object's orientation seen from the receiving section 103 is further measured, the position of the object can be also obtained. Here, for a method of obtaining the object's orientation, a large number of techniques, such as a beam foaming method, an adaptive beam foaming, and the like, are generally known.

In the case where the transmitting section 102 and the receiving section 103 are separated from each other, the object detection section 105 obtains a distance from each of the transmitting section 102 and the receiving section 103 to the object on the basis of the period of time $t_0$ and the object's orientation at the receiving section 103.

Figure 4:
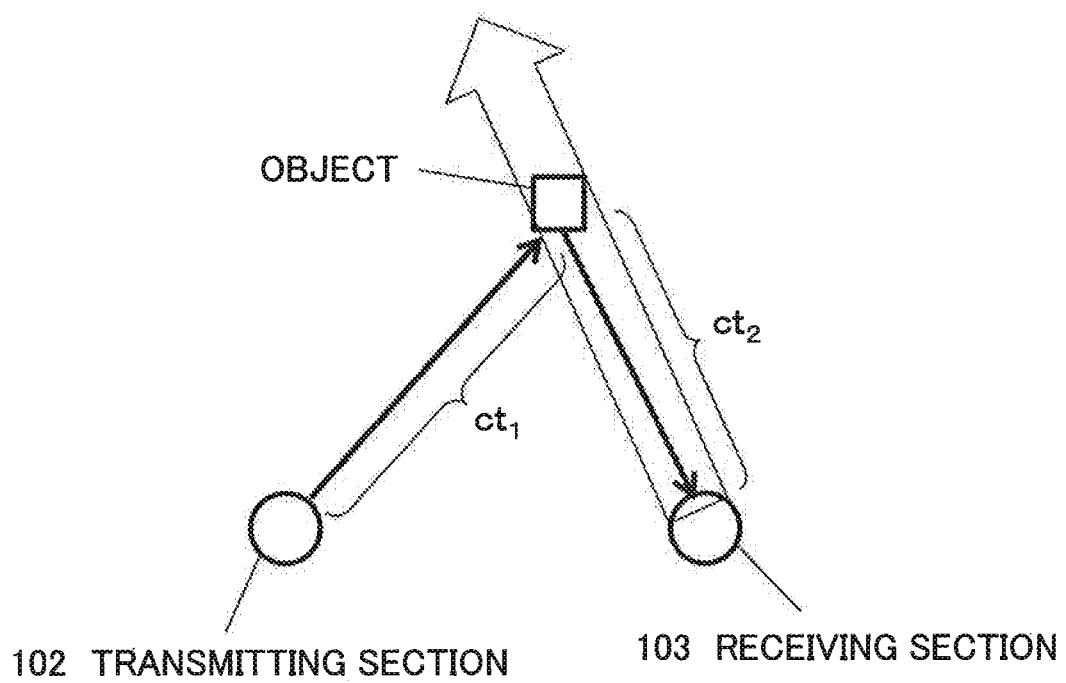
FIG. 4 is a diagram illustrating an operation of calculating a distance to an object in the case where a transmitting section and a receiving section are separated from each other.

FIG. 4 is a diagram illustrating an operation of calculating a distance to an object by the object detection section 105 in the case where the transmitting section 102 and the receiving section 103 are separated from each other. For example, a path that is composed of a first path from the transmitting section 102 to an object and a second path from the object to the receiving section 103 and that meets the following criteria is obtained: The sum of the first and second paths is equal to $ct_0$, and an orientation of the path matches the object's orientation seen from the receiving section 103. Assuming $t_1$ is the time the transmission signal transmitted from the transmitting section 102 has taken to reach the object, the distance between the transmitting section 102 and the object is $ct_1$. Assuming $t_2$ is the time the transmission signal reflected from the object has taken to reach the receiving section 103, the distance between the object and the receiving section 103 is $ct_2$. Based on $ct_0$ derived from a transmission time point and a reception time point; the relation that satisfies a formula, $ct_0=ct_1+ct_2$; the distance between the transmitting section 102 and the receiving section 103; and the object's orientation seen from the receiving section 103, not only $ct_1$ and $ct_2$ but also the position of the object can be obtained in a geometric way.

Note that each of constituent elements of each of the moving object detection system 1 according to the first exemplary embodiment and illustrated in FIG. 1 and moving object detection systems according other exemplary embodiments described later indicates a functional-unit based block. A portion or the whole of each constituent element of the moving object detection system 1 according to the first exemplary embodiment and the moving object detection systems according to other exemplary embodiments described later may be implemented by any combination of a computer, such as a computer 50, illustrated in FIG. 12, and a program. In one example, the computer 50 includes the following components.

- a central processing unit (CPU) 51
- a read only memory (ROM) 52
- a random access memory (RAM) 53
- a program 54 to be loaded into the RAM 53
- a storage device 55 for storing in itself the program 54
- a drive device 57 for performing reading/writing into/from a recording medium 56
- a communication interface 58 connected to a communication network 59
- an input/output interface 60 through which data is input/output
- a bus 61 through which individual components are connected to one another.

Each of the constituent elements of the individual exemplary embodiments executes its function by allowing the CPU 51 to acquire and execute the program 54 for implementing the function. For example, in the example of the moving object detection system 1 illustrated in FIG. 1, the transmission waveform setting section 101 may execute its function by allowing the CPU 51 having acquired the program 54 to store a transmission waveform having been set via the input/output interface 60 into the drive device 57 or the like. Further, the transmitting section 102 may execute its function by allowing the CPU 51 having acquired the program 54 to convert the transmission waveform stored in the drive device 57 or the like into an analog electric signal, and output the analog electric signal. Further, the receiving section 103 may execute its function by allowing the CPU 51 having acquired the program 54 to convert an analog electric signal having been input to the receiving section 103 into a digital electric signal. Further, the Doppler coefficient estimating section 104 may execute its function by allowing the CPU 51 having acquired the program 54 to estimate a Doppler coefficient on the basis of reception signals. Further, the object detection section 105 may execute its function by allowing the CPU 51 having acquired the program 54 to read a transmission waveform, a Doppler coefficient, and reception signals, these elements being stored in the drive device 57 or the like; detect an object; and output the position and the like of the object to the input/output interface 60.

The program 54 for implementing the function of each of the constituent elements of the individual exemplary embodiments is stored in, for example, the storage device 55, the ROM 52, or the RAM 53 in advance, and may be configured to be read by the CPU 51 when needed.

Note that the program 54 may be supplied to the CPU 51 through the communication network 59, or may be stored in the recording medium 56 in advance to allow the drive device 57 to read the relevant program and supply it to the CPU 51.

Further, there are various modification examples in the method of implementing each of the exemplary embodiments. The constituent elements of each of the exemplary embodiments may be implemented, for each of the constituent elements, by any combination of one of mutually independent information processing apparatuses, and a program. Further, a plurality of constituent elements included in each of the moving object detection systems may be implemented by any combination of one information processing apparatus and a program.

Further, a portion or the whole of each constituent element of each exemplary embodiment may be implemented by general-purpose circuitry, dedicated circuitry, a processor or the like, or a combination of any ones of these components. These components may be each configured by a single chip, or a plurality of chips connected to one another via a bus. A portion or the whole of each constituent element of each constituting element may be implemented by a combination of the above circuitry and the like, and a program.

When a portion or the whole of each constituent element of each exemplary embodiment is implemented by a plurality of components such as the processor and the circuitry, the plurality of components such as the processor and the circuitry may be arranged in a concentrated manner or in a distributed manner. For example, the plurality of components such as the processor and the circuitry may be implemented as a configuration in which a client and server system, a cloud computing system, and/or the like are connected to one another through a communication network.

Figure 5:
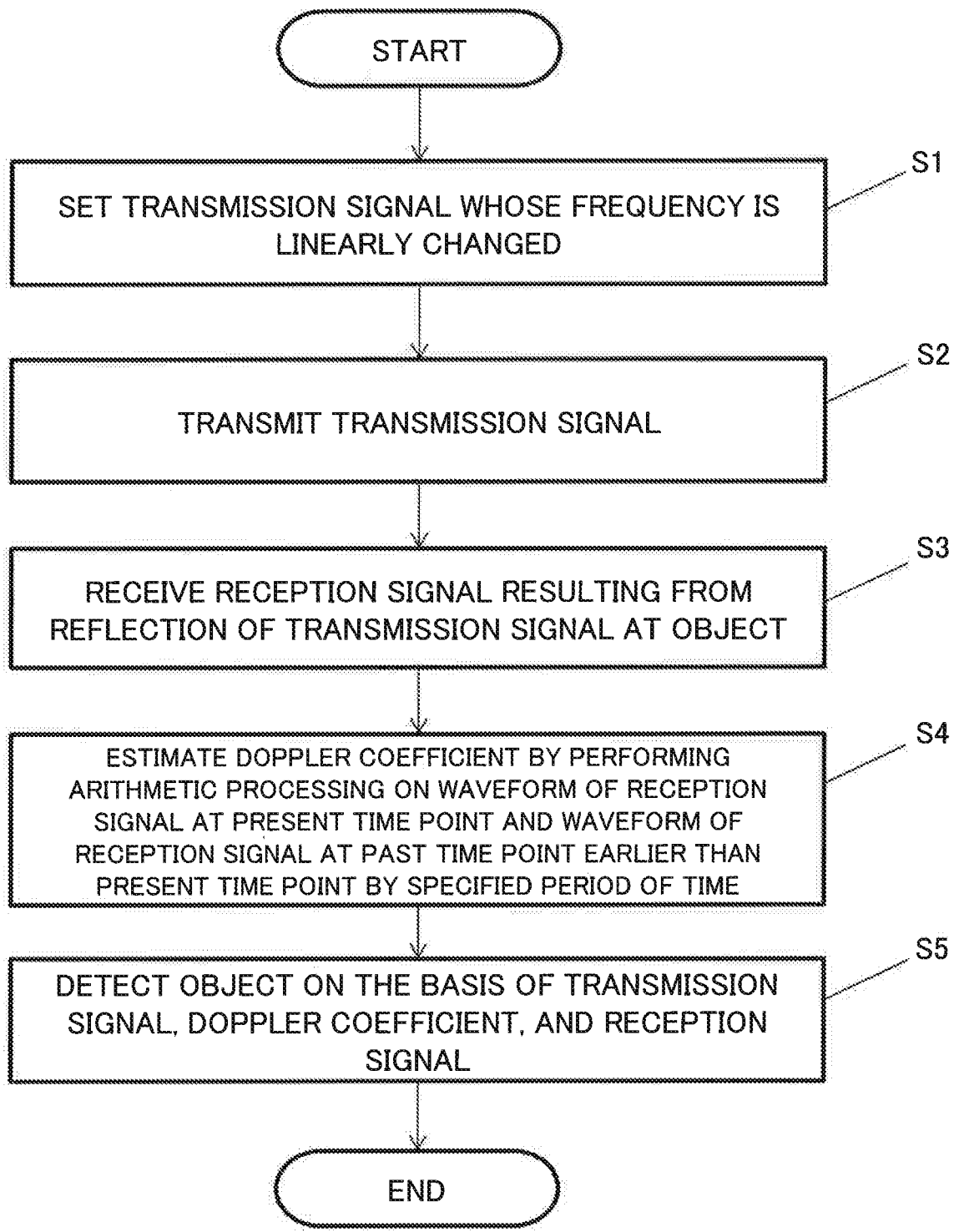
FIG. 5 is a flowchart illustrating the operation of FIG. 1.

Next, the operation of the present exemplary embodiment will be described. FIG. 5 is a flowchart illustrating the operation of the present exemplary embodiment.

First, the transmission waveform setting section 101 stores in itself a transmission waveform having been set on the basis of, for example, a setting operation by a user for setting the transmission waveform (step S1).

Next, the transmitting section 102 converts the transmission waveform, which is stored in the transmission waveform setting section 101, into an analog electric signal, and transmits a transmission signal on the basis of the analog electric signal (step S2). For example, in the case of a sonar, the transmitting section 102 transmits an acoustic wave into the sea on the basis of the analog electric signal. In the case of a radar, the transmitting section 102 transmits a radio wave into the air on the basis of the analog electric signal.

Next, the receiving section 103 receives incident reception signals including a reception signal resulting from the reflection of the transmission signal having been transmitted by the transmitting section 102 at an object (step S3). Further, the receiving section 103 converts the reception signal into a digital electric signal, and outputs the reception signal, as the digital electric signal. For example, in the case of the sonar, the receiving section 103 receives an incident acoustic wave; converts the acoustic wave into a digital electric signal; and outputs the reception signal as the digital electric signal. In the case of the radar, the receiving section 103 converts an incident radio wave into a digital electric signal, and outputs the reception signal as the digital electric signal.

Further, the Doppler coefficient estimating section 104 estimates a Doppler coefficient η by performing arithmetic processing on a waveform of the reception signal at a present time point and a waveform of the reception signal at a past time point earlier than the present time point by a specified period of time (step S4).

Next, the object detection section 105 detects the object on the basis of a transmission signal, the Doppler coefficient and a reception signal (step S5).

As described above, the moving object detection system 1 according to the present exemplary embodiment calculates a Doppler coefficient associated with the movement of an object by performing arithmetic processing on the waveform of a reception signal at a present time point and the waveform of a reception signal at a past time point earlier than the present time point by a specified period of time. With this configuration, in a moving object consecutive detection system and a moving object detection method that use a transmission wave whose frequency is linearly modulated, measurement of the distance to the object and the velocity of the object can be correctly made without approximating that the frequency difference for the transmission wave and the reception wave is independent of time, and thus, the accuracy of the measurement can be enhanced.

Second Exemplary Embodiment

Figure 6:
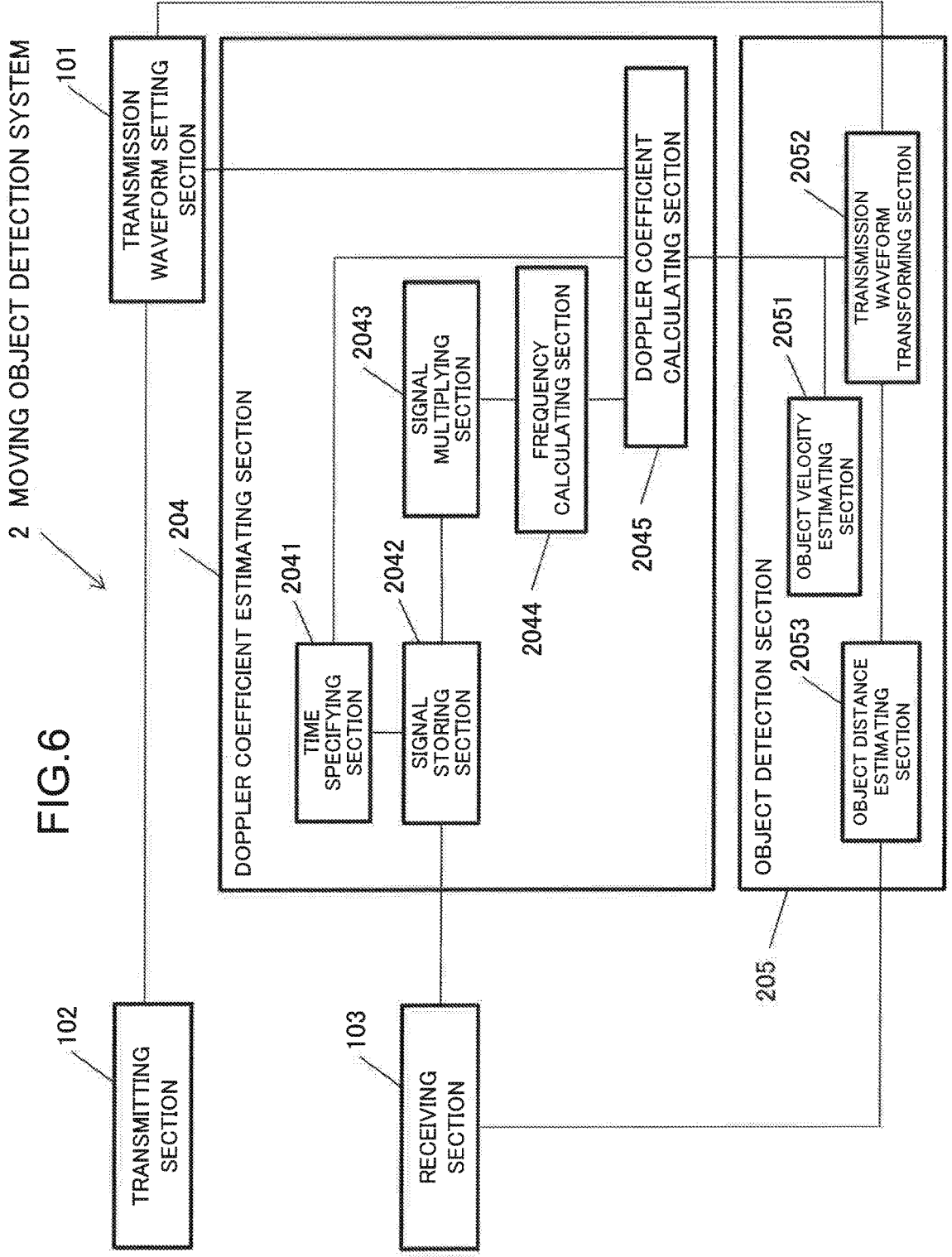
FIG. 6 is a block diagram illustrating a configuration of a second exemplary embodiment.

Next, a second exemplary embodiment of the present invention will be described. FIG. 6 is a block diagram illustrating a configuration of the second exemplary embodiment. As illustrated in FIG. 6, a moving object detection system 2, which is a moving object detection system according to the present exemplary embodiment, includes the transmission waveform setting section 101, the transmitting section 102, and the receiving section 103, as in the first exemplary embodiment. Meanwhile, a Doppler coefficient estimating section 204 of the present exemplary embodiment is configured to include a time specifying section 2041, a signal storing section 2042, a signal multiplying section 2043, and a frequency calculating section 2044, and a Doppler coefficient calculating section 2045.

The time specifying section 2041 specifies one or more periods of time each for identifying a corresponding one of one or more past reception signals (each being hereinafter referred to as a past signal) for use in the estimation of a Doppler coefficient. The time specifying section 2041 specifies one or more specified periods of time ti during a period from a present time point until a received time point of a past signal. Here, i is 1, 2, 3 . . . N, and N is larger than or equal to "1". Note that, in the case where a transmission signal is set in such a way that the change of its linearly increasing frequency is periodically repeated with a repetition cycle L, the one or more specified periods of time ti are set within a time range corresponding to a straight-line segment on which the present time point exists.

The signal storing section 2042 stores in itself one or more past signals which were received by the receiving section 103 and each of which is earlier than the present time point by a corresponding one of the specified time points ti, which have been specified by the time specifying section 2041. Further, the signal storing section 2042 also stores in itself a present reception signal (hereinafter referred to as a present signal).

For example, the signal multiplying section 2043 calculates the complex conjugate of a waveform Sr(t−t$_i$), which is the waveform of a reception signal earlier than the present time point by a specified time point ti, which is externally specified, and calculates a multiplied signal by multiplying the calculated complex conjugate and a waveform Sr(t), which is the waveform of a reception signal at the present time point.

For example, when the reception signal at the present time point is represented by the above formula (2), a reception signal having been received earlier than the present time point by the specified period of time ti can be represented by the following formula (12).

$$S_r(t-t_i) = A\sqrt{\eta}\exp\left\{j\omega\cdot\eta(t-t_i-t_0) + \frac{j\mu\cdot\eta^2(t-t_i-t_0)^2}{2}\right\} \quad (12)$$

Note that, in this case, when a period of time required for the change of the frequency of the reception signal from its minimum frequency to its maximum frequency or from its maximum frequency to its minimum frequency is represented by L', the specified period of time point ti satisfies an inequality, $0<t_i\leq L'$.

The signal multiplying section 2043 calculates the product of the waveform Sr(t) of the reception signal at the present time point and the complex conjugate of the waveform Sr(t−t$_i$) of the reception signal earlier than the present time point by the specified time point ti. A waveform Sr(t)·Sr*(t−t$_i$) of a multiplied signal that is the product of the present signal represented by the formula (2) and the complex conjugate of the past signal having been received earlier than the present time point by the specified time point ti and represented by the formula (12) can be represented by the following formula (13).

$$S_r(t)\cdot S_r^*(t-t_i) = |A|^2\eta\exp\left\{j\omega\cdot\eta t_i + \frac{j\mu\cdot\eta^2(2t_it-2t_it_0-t_i^2)}{2}\right\} \quad (13)$$

According to the formula (13), an element depending on time in the phase of the waveform Sr(t)·Sr*(t−t$_i$) of the multiplied signal is $\mu\cdot\eta^2 t_i t$. Accordingly, the multiplied signal forms a wave having an angular frequency whose absolute value is represented by $|\mu\cdot\eta^2 t_i|$ and is constant.

According to the above study, for each of the one or more specified periods of time t$_i$, the frequency calculating section 2044 performs frequency spectrum analysis of the multiplied signal, which is the product of the present signal and the complex conjugate of the past signal having been received earlier than the present time point by the each of the one or more specified periods of time ti to obtain one or more frequency absolute values |f$_i$|.

Figure 7:
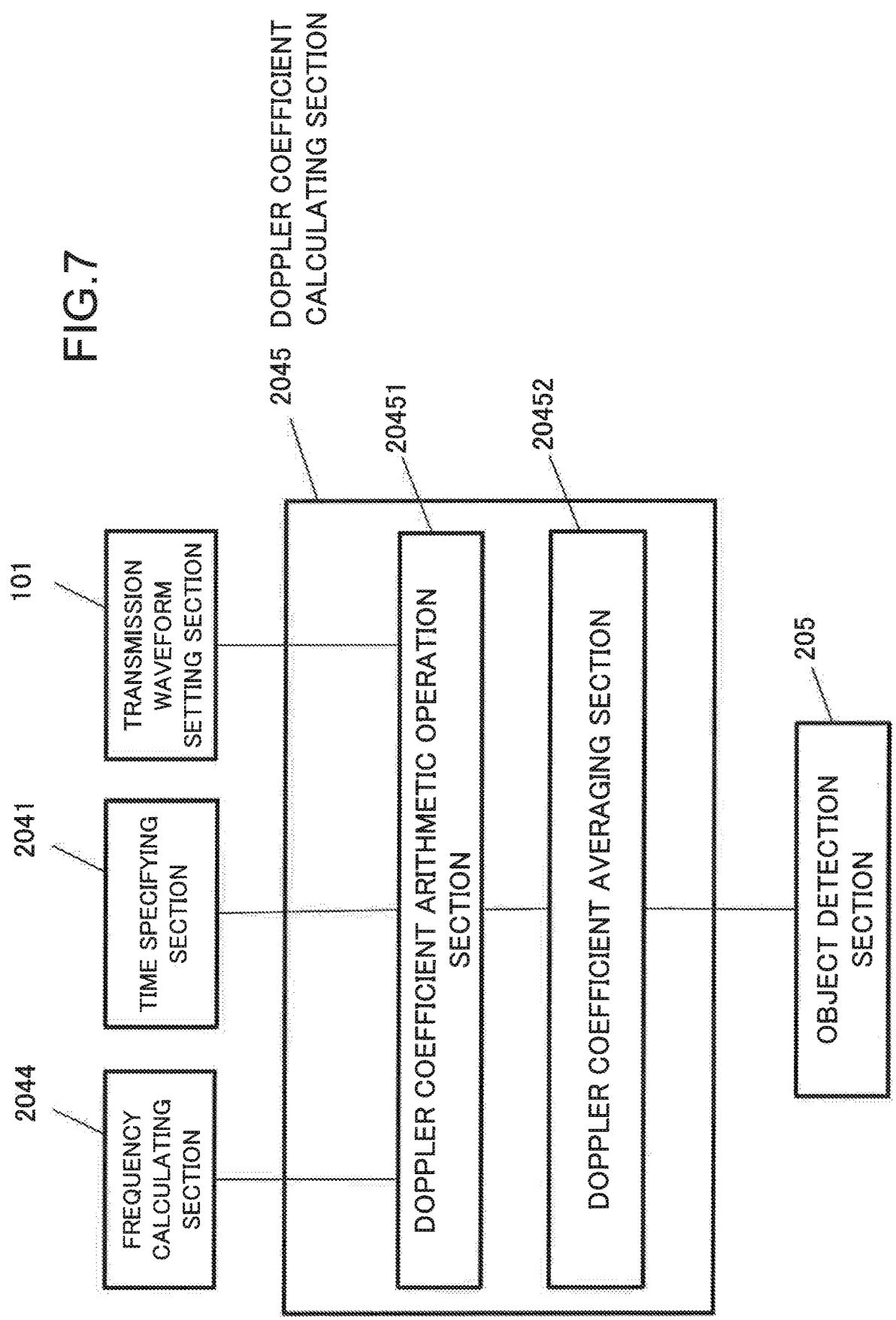
FIG. 7 is a block diagram illustrating a configuration of a Doppler coefficient calculating section of FIG. 6.

The Doppler coefficient calculating section 2045 calculates one Doppler coefficient from one or more frequencies fi having been output from the frequency calculating section 2044. FIG. 7 is a block diagram illustrating an example of the configuration of the Doppler coefficient calculating section 2045 of FIG. 6. As illustrated in FIG. 7, the Doppler coefficient calculating section 2045 includes a Doppler coefficient arithmetic operation section 20451 and a Doppler coefficient averaging section 20452.

The Doppler coefficient arithmetic operation section 20451 calculates one or more Doppler coefficients $\eta_i$ from the one or more frequencies f$_i$ having been output from the frequency calculating section 2044, respectively, and outputs the one or more calculated Doppler coefficients $\eta_i$ to the Doppler coefficient averaging section 20452. The Doppler coefficient arithmetic operation section 20451 acquires μ from the transmission waveform setting section 101, substitutes the acquired μ and each of the one or more specified periods of time $t_i$ into the following formula (14), and obtains the one or more Doppler coefficients $\eta_i$.

$$\eta_i = \sqrt{\frac{2\pi|f_i|}{|\mu t_i|}} \quad (14)$$

In this case, all of the one or more Doppler coefficients $\eta_i$ become equal to one another in the case where no measurement error exists and no disturbance such as noise or the like exists. Here, a plurality of Doppler coefficients $\eta_i$ are taken into consideration on the assumption that, because of the measurement error and/or the disturbance such as noise or the like, the values of the Doppler coefficients are different from one another.

The Doppler coefficient averaging section 20452 averages the plurality of Doppler coefficients $\eta_i$ using the following formula (15) to obtain a mean Doppler coefficient $\eta_{mean}$.

$$\eta_{mean} = \frac{\sum_{i=1}^{N} \eta_i}{N} \quad (15)$$

The Doppler coefficient averaging section 20452 averages the one or more Doppler coefficients $\eta_i$, which have been output from the Doppler coefficient arithmetic operation section 20451, and outputs one Doppler coefficient $\eta$ to the object detection section 205.

Referring back to FIG. 6, the configuration of the second exemplary embodiment will be further described. As illustrated in FIG. 6, the object detection section 205 of the present exemplary embodiment includes an object velocity estimating section 2051, a transmission waveform transforming section 2052, and an object distance estimating section 2053.

The object velocity estimating section 2051 obtains a line-of-sight direction velocity of the object on the basis of the Doppler coefficient $\eta$, which has been output from the Doppler coefficient estimating section 204. The object velocity estimation section 2051 calculates the velocity $v_o$, which is the velocity of the object, using the above formula (8) on the basis of the Doppler coefficient $\eta$ having been output from the Doppler coefficient estimating section 204, a propagation velocity c, which is a propagation velocity of the transmission signal and the reception signal, and the velocity $v_s$, which is the velocity of the receiving section.

The transmission waveform transforming section 2052 acquires a transmission waveform from the transmission waveform setting section 101, and generates a transformed transmission waveform by transforming the acquired transmission waveform according to the Doppler coefficient $\eta$, which have been output from the Doppler coefficient estimating section 204. For example, the transmission waveform is assumed to be the transmission waveform St(t) represented by the formula (1). In this case, the transmission waveform transforming section 2052 generates the transformed transmission waveform St' (t) represented by the above formula (9).

The object distance estimating section 2053 estimates a distance to the object on the basis of the generated, transformed transmission waveform St'(t) and the reception signal Sr(t) at the present time point. For example, first, the object distance estimating section 2053 calculates the multiplied signal represented by the above formula (10) by multiplying the transformed transmission waveform St'(t) by the complex conjugate Sr*(t) of the reception waveform Sr(t). It can be understood from the formula (10) that the absolute value of the angular frequency of the waveform Sr*(t)St'(t) of the multiplied signal becomes $|\mu \cdot \eta^2 t_0|$, and thus, the object distance estimating section 2053 performs frequency spectrum analysis of the multiplied signal to obtain the frequency absolute value |f|. Moreover, the object distance estimating section 2053 acquires μ from the transmission waveform setting section 101; acquires η from the Doppler coefficient estimation section 104; and calculates the period of time $t_0$ using the above formula (11).

In the case where the transmitting section 102 and the receiving section 103 are located at the same place, the period of time $t_0$ is a round-trip time of the wave to/from the object, and thus, the object distance estimating section 2053 calculates $ct_0/2$ to obtain the distance to the object. When an object's orientation seen from the receiving section 103 is further measured, the position of the object can be also obtained. Here, for a method of obtaining the orientation of the object, a large number of techniques, such as a beam foaming method, an adaptive beam foaming, and the like, are generally known.

In the case where the transmitting section 102 and the receiving section 103 are separated from each other, as described above using FIG. 4, the object distance estimating section 2053 can obtain not only a distance from each of the transmitting section 102 and the receiving section 103 to the object but also the position of the object on the basis of the period of time t0 and the object's orientation at the receiving section 103.

Figure 8:
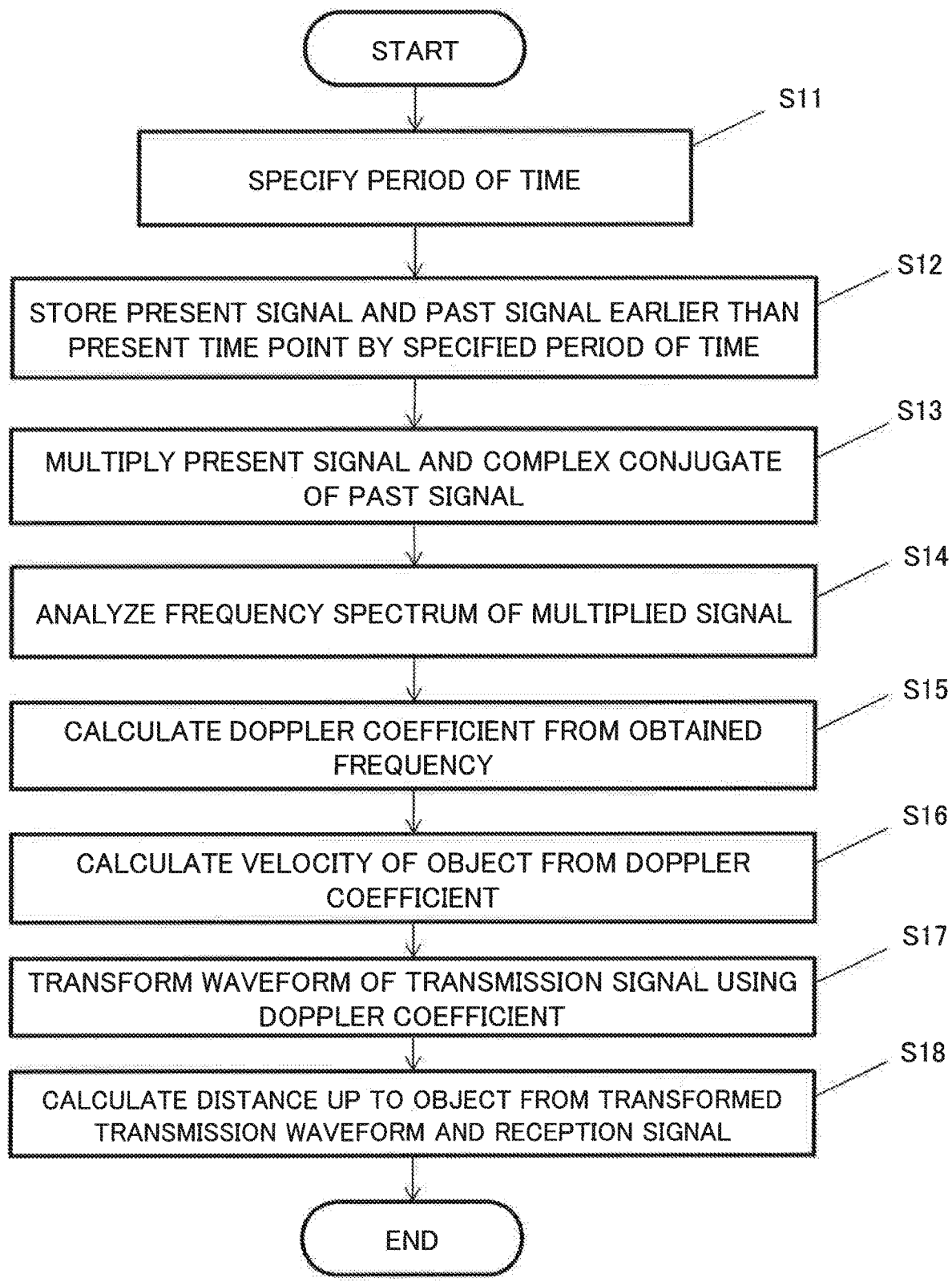
FIG. 8 is a flowchart illustrating the operation of a Doppler coefficient estimating section and an object detection section of FIG. 6.

Next, the operation of the second exemplary embodiment will be described. FIG. 8 is a flowchart illustrating the operation of the second exemplary embodiment of the present invention. First, the time specifying section 2041 specifies one or more specified time points $t_i$ (i=1, 2, 3 . . . N, and N≥1) during a period from a present time point until a received time point of a past signal (step S11). The signal storing section 2042 stores in itself the present signal Sr(t) and the one or more past signals Sr(t–$t_i$), each having been received by the receiving section 103 at a time point earlier than the present time point by a corresponding one of the one or more specified periods of time $t_i$, which are specified by the time specifying section 2041 (step S12). Further, the signal multiplying section 2043 multiplies the present signal Sr(t) and the complex conjugate Sr*(t–$t_i$) of each of the one or more past signals (step S13). Next, the frequency calculating section 2044 performs frequency spectrum analysis of one or more multiplied signals having been output from the signal multiplying section 2043 to calculate one or more frequencies $f_i$ (i=1, 2, 3 . . . N, and N≥1) (step S14). The Doppler coefficient calculating section 2045 calculates the one Doppler coefficient η on the basis of the one or more frequencies $f_i$, which have been output from the frequency calculating section 2044, in such a way as described above (step S15). The object velocity estimating section 2051 calculates the velocity vo of the object, using the above formula (8), on the basis of the Doppler coefficient η, which have been output from the Doppler coefficient estimating section 204, the propagation velocity c of the transmission signal and the reception signal, and the velocity vs of the receiving section (step S16). The transmission waveform transforming section 2052 acquires the transmission waveform St(t) from the transmission waveform setting section 101 and generates the transformed transmission waveform St'(t) by transforming the acquired transmission waveform St(t) according to the Doppler coefficient η having been output from the Doppler coefficient estimating section 204 in such a way as described above (step S17). The object distance estimating section 2053 estimates a distance to the object on the basis of the generated, transformed transmission waveform St'(t) and the reception signal Sr(t) at the present time point, in such a way as described above (step S18).

According to the above-described second exemplary embodiment, a reception signal at a present time point is multiplied with the complex conjugate of each of one or more past signals that is earlier than the present time point by a corresponding one of one or more specified time points to obtain one or more multiplied signals; frequency spectrum analysis of the obtained one or more multiplied signals is performed to obtain one or more frequencies; and a Doppler coefficient is calculated from the obtained one or more frequencies. With this configuration, as in the first exemplary embodiment, in a moving object consecutive detection system and a moving object detection method that use a transmission wave whose frequency is linearly modulated, measurement of the distance to the object and the velocity of the object can be correctly made without approximating that the frequency difference for the transmission wave and the reception wave is independent of time, and thus, the accuracy of the measurement can be enhanced.

Third Exemplary Embodiment

Figure 9:
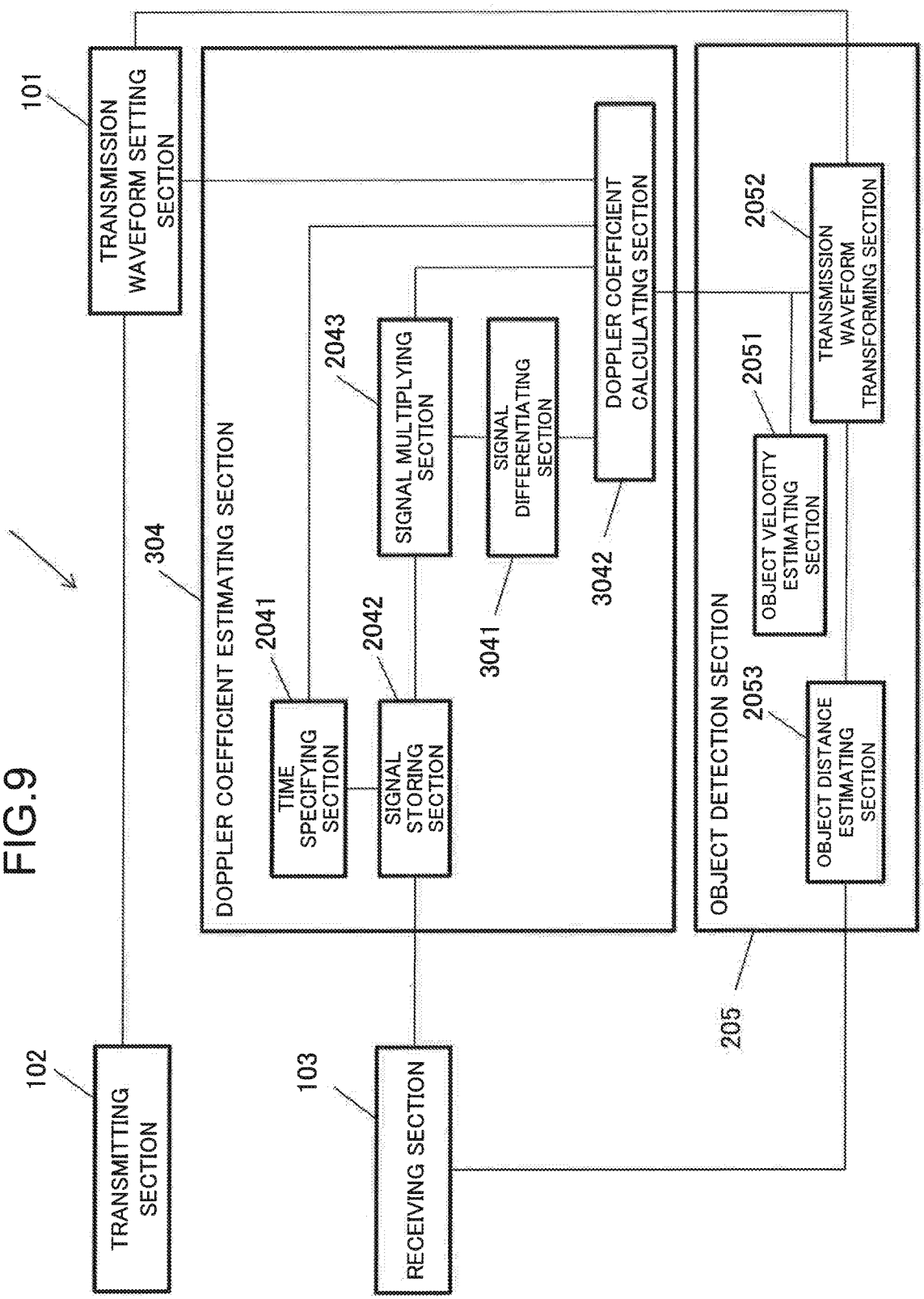
FIG. 9 is a block diagram illustrating a configuration of a third exemplary embodiment.

Next, a third exemplary embodiment of the present invention will be described. FIG. 9 is a block diagram illustrating a configuration of the third exemplary embodiment of the present invention. Referring to FIG. 9, a moving object detection system 3, which is a moving object detection system according to the present exemplary embodiment, includes the transmission waveform setting section 101, the transmitting section 102, the receiving section 103, and the object detection section 205, as in the second exemplary embodiment. Further, a Doppler coefficient estimating section 304, which is a Doppler coefficient estimating section according to the present exemplary embodiment, includes the time specifying section 2041, the signal storing section 2042, and the signal multiplying section 2043, as in the second exemplary embodiment. Meanwhile, the Doppler coefficient estimating section 304 according to the present exemplary embodiment includes a signal differentiating section 3041 and a Doppler coefficient calculating section 3042. The signal differentiating section 3041 obtains a differentiated signal by performing time differentiation of the multiplied signal, and the Doppler coefficient calculating section 3042 obtains a Doppler coefficient from the multiplied signal and the differentiated signal.

The signal multiplying section 2043 multiples the present signal represented by the formula (2) and the complex conjugate of a past signal, which has been received earlier than a present time point by a specified time point ti, and outputs a multiplied signal represented by the above formula (13).

In the present exemplary embodiment, the signal differentiating section 3041 performs time differentiation of the multiplied signal, which have been output from the signal multiplying section 2043. For example, when each of the plurality of multiplied signals, which is represented by the formula (13), is time-differentiated, a differentiated signal represented by the following formula (16) is obtained.

$$\frac{d}{dt} S_r(t) \cdot S_r^*(t - t_i) = \qquad (16)$$

$$j\mu \cdot \eta^2 t_i |A|^2 \eta \exp\left\{ j\omega \cdot \eta t_i + \frac{j\mu \cdot \eta^2 (2t_i t - 2t_i t_0 - t_i^2)}{2} \right\}$$

The following formula (17) is obtained from the formula (13) and the formula (16).

$$\frac{\left|\frac{d}{dt} S_r(t) \cdot S_r^*(t - t_i)\right|}{|S_r(t) \cdot S_r^*(t - t_i)|} = |\mu \cdot \eta^2 t_i| \qquad (17)$$

The Doppler coefficient calculating section 3042 obtains a ratio between the absolute value of the above multiplied signal and the absolute value of the above differentiated signal; acquires μ from the transmission waveform setting section 102; acquires the specified periods of time $t_i$ (i=1, 2, 3 ... N, and N≥1) from the time specifying section 2041; and calculates a plurality of Doppler coefficients $\eta_i$ using the following formula (18).

$$\eta_i = \sqrt{\frac{\left|\frac{d}{dt} S_r(t) \cdot S_r^*(t - t_i)\right|}{|S_r(t) \cdot S_r^*(t - t_i)||\mu \cdot t_i|}} \qquad (18)$$

The Doppler coefficient calculating section 3042 may include a Doppler coefficient arithmetic operation section and a Doppler coefficient averaging section. In this case, the Doppler coefficient arithmetic operation section of the Doppler coefficient calculating section 3042 acquires μ from the transmission waveform setting section 102; acquires the one or more specified periods of time $t_i$ (i=1, 2, 3 ... N, N≥1, and 0≤$t_i$≤L) from the time specifying section 2041; calculates one or more Doppler coefficients $\eta_i$ (i=1, 2, 3 ... N, and N≥1) using the above formula (18); and outputs the one or more Doppler coefficients $\eta_i$ to the Doppler coefficient averaging section of the Doppler coefficient calculating section 3042. The Doppler coefficient averaging section of the Doppler coefficient calculating section 3042 averages the plurality of Doppler coefficients $\eta_i$, which have been calculated by the Doppler coefficient arithmetic operation section, obtains a mean Doppler coefficient $\eta_{mean}$, and outputs the one Doppler coefficient η to the object detection section 205.

In the object detection section 205, as in the second exemplary embodiment, the object velocity estimating section 2051 obtains a line-of-sight direction velocity of the object on the basis of the Doppler coefficient η, which has been output from the Doppler coefficient estimating section 304, in the same way as that of the second exemplary embodiment. Further, as in the second exemplary embodiment, the transmission waveform transforming section 2052 generates a transformed transmission waveform by acquiring a transmission waveform from the transmission waveform setting section 101 and transforming the acquired transmission waveform according to the Doppler coefficient η, which has been output from the Doppler coefficient estimating section 204, and the object distance estimating section 2053 estimates a distance to the object on the basis of the generated, transformed transmission waveform and a reception signal at the present time point, in the same way as that of the second exemplary embodiment.

According to the above-described third exemplary embodiment, a reception signal at a present time point is multiplied by the complex conjugate of a past signal that is a past reception signal earlier than the present time point by a specified time point; the obtained multiplied signal is differentiated; and a Doppler coefficient is calculated from the differentiated signal obtained by differentiation and the multiplied signal. With this configuration, as in the first and second exemplary embodiments, in a moving object consecutive detection system and a moving object detection method that use a transmission wave whose frequency is linearly modulated, measurement of the distance to the object and the velocity of the object can be correctly measured without approximating that the frequency difference for the transmission wave and the reception wave is independent of time, and thus, the accuracy of the measurement can be enhanced.

Heretofore, the present invention has been described referring to the above exemplary embodiments, but the present invention is not limited to the above exemplary embodiments. Various modifications understandable by those skilled in the art can be made on the configuration and the details of the present invention within the scope of the present invention.

Figure 10:
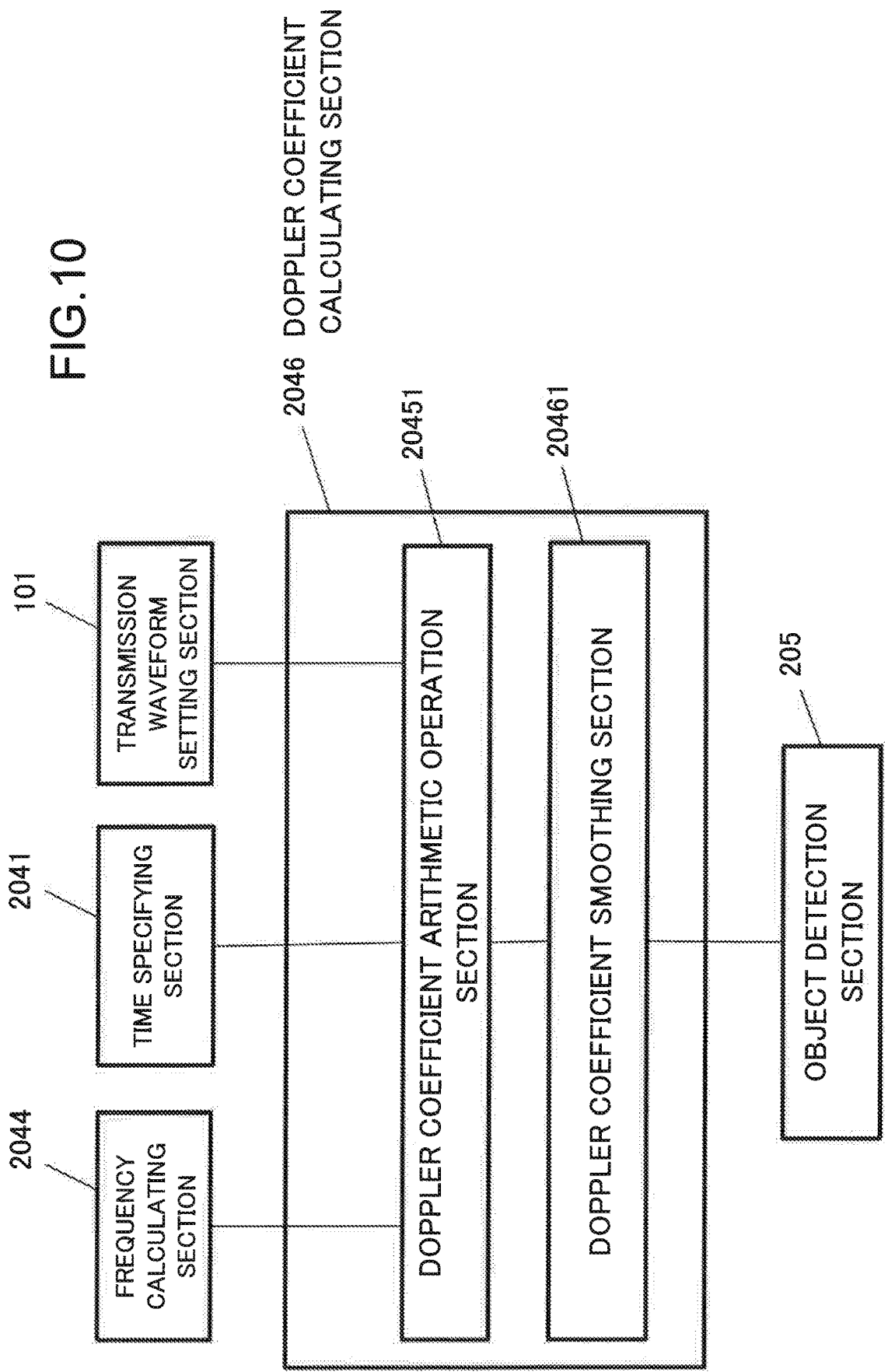
FIG. 10 is a block diagram illustrating a configuration of a modification example of a Doppler coefficient calculating section of each of FIGS. 6 and 9.

FIG. 10 is a block diagram illustrating a configuration of a modification example of the Doppler coefficient calculating section of each of FIGS. 6 and 9. In this modification example, the Doppler coefficient calculating section 2046 includes a Doppler coefficient smoothing section 20461 instead of the Doppler coefficient averaging section 20452.

Figure 11:
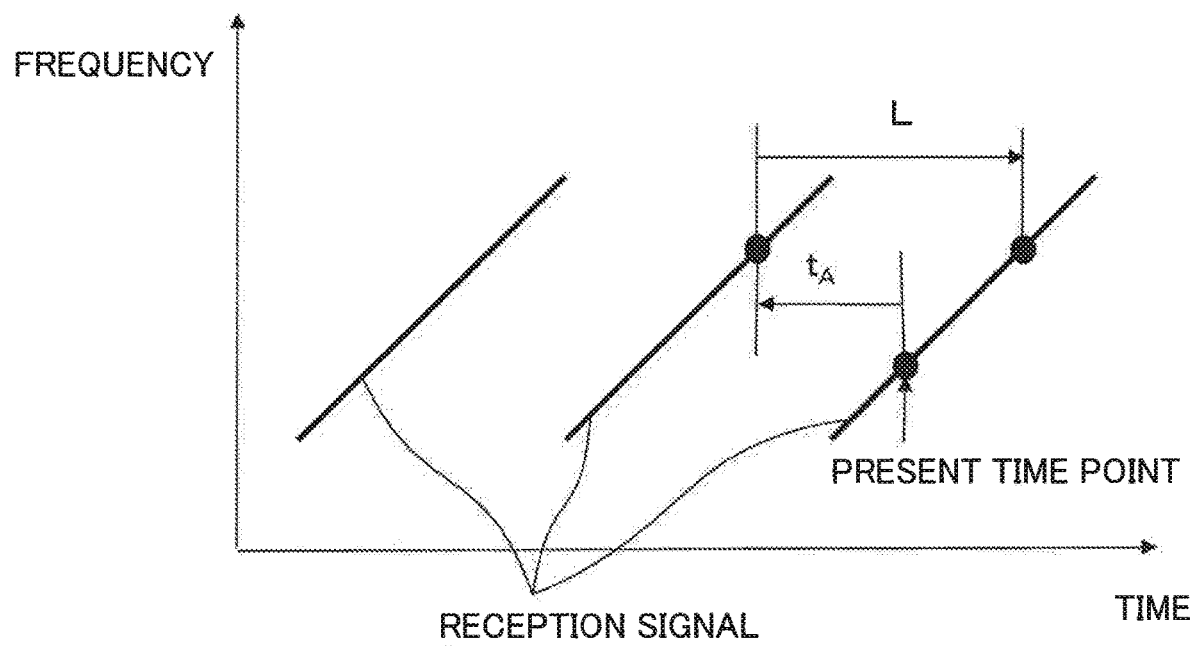
FIG. 11 is a diagram illustrating a case where one maximum frequency or one minimum frequency exists during a period from a present time point until a time point earlier than the present time point by a specified period of time.

Similarly to the example of FIG. 7, the Doppler coefficient arithmetic operation section 20451 calculates each of the one or more Doppler coefficients ηi on the basis of a corresponding one of the one or more frequencies fi, which have been output from the frequency calculating section 2044, and outputs the calculated one or more Doppler coefficients $\eta_i$ to the Doppler coefficient smoothing section 20461. However, in the case where at least one of the maximum frequency and the minimum frequency exists during a period from the present time point until a past time point ti, the formula (13), for example, does not hold, and thus, the Doppler coefficient cannot be correctly obtained. An example in which one maximum frequency and one minimum frequency exist during a period from the present time point until a past time point $t_i$ is illustrated in FIG. 11. At this time, when the time interval between the maximum frequency and the minimum frequency of each set of reception signals is denoted by L', a past reception signal at the past time point $t_i$ is the same as a reception signal obtained by shifting the phase of the past reception signal forward in time by the time interval and thus, the past reception signal has a waveform represented by the following formula (19).

$$S_r(t - t_i) = A\sqrt{\eta} \exp\left\{ j\omega \cdot \eta(t - t_i + L' - t_0) + \frac{j\mu \cdot \eta^2(t - t_i + L' - t_0)^2}{2} \right\} \quad (19)$$

Thus, a multiplied signal resulting from the multiplication of the present signal represented by the formula (2) and the past reception signal represented by the formula (19) is represented by the following formula (20).

$$S_r(t) \cdot S_r^*(t - t_A) = |A|^2 \quad (20)$$

-continued
$$\eta \exp\left[ j\omega \cdot \eta(t_A - L') + \frac{j\mu \cdot \eta^2(t_A + L')t - 2(t_A - L')t_0 - (t_A - L')^2\}}{2} \right]$$

An element depending on time in the phase is $\mu \cdot \eta^2(t_i - L')t$. Since $t_i \leq L'$, a frequency f', which is obtained by performing frequency analysis, becomes $\mu \cdot \eta^2(L' - t_i)/2\pi$. When $t_i \ll L'$, the frequency f' becomes larger than a frequency f ($= \mu \cdot \eta^2 t_i / 2\pi$), which is a frequency in the case where no maximum value and no minimum value for the frequency exist during the period from the present time point until the past time point ti. Accordingly, for a Doppler coefficient obtained from the multiplied signal, the following formula (21) also hold.

$$\eta = \sqrt{\frac{2\pi f}{\mu t_i}} \ll \eta' = \sqrt{\frac{2\pi f'}{\mu t_i}} \quad (21)$$

In the case where, for each of reception signals, a corresponding one of Doppler coefficients is sequentially obtained from a corresponding one of multiplied signals, even when a situation where at least one of the maximum value and the minimum value for the frequency exists during a period from the present time point until the past time point ti has occurred, this situation can be discriminated because the value of a corresponding Doppler coefficient suddenly increases. Further, a correct Doppler coefficient can be obtained by performing averaging except for such a Doppler coefficient whose value has suddenly increased.

The Doppler coefficient smoothing section 20461 stores the Doppler coefficients ηi, each of which is sequentially output by the Doppler coefficient arithmetic operation section 20451, in time-series order, and performs smoothing of the Doppler coefficients ηi within a time range that is externally given in advance. Specifically, in the case where, for each of reception signals, a corresponding one of Doppler coefficients is sequentially obtained from a corresponding one of multiplied signals, when the value of a corresponding Doppler coefficient has suddenly increased because of the occurrence of a situation where at least one of the maximum value and the minimum value for the frequency exists during a period from the present time point until the past time point ti, the Doppler coefficient smoothing section 20461 removes such a Doppler coefficient. Further, the Doppler coefficient smoothing section 20461 averages Doppler coefficients other than such one or more removed Doppler coefficients to obtain one mean Doppler coefficient, and outputs the obtained Doppler coefficient to the object detection section 205.

Note that, although, in the present modified example, the Doppler coefficient smoothing section 20461 determines the magnitude of each of the Doppler coefficients and then performs the averaging, the configuration for obtaining the Doppler coefficient is not limited to this configuration. For example, there may be employed a configuration in which a coefficient arithmetic operation section sequentially performs arithmetic operation for obtaining a Doppler coefficient while, upon sudden increase of the absolute value of an input frequency, determining that at least one of the maximum value and the minimum value for the frequency has been inserted between the present time point and a corresponding past time point, and removing such an input frequency from the arithmetic operation, and then, the Doppler coefficient arithmetic operation section outputs the obtained Doppler coefficient to a Doppler coefficient averaging section.

While the invention has been particularly shown and described with reference to exemplary embodiments thereof, the invention is not limited to these embodiments.

It will be understood by those of ordinary skill in the art that various changes in form and details may be made therein without departing from the spirit and scope of the present invention as defined by the claims.

The invention claimed is:

1. A moving object detection system comprising:
   at least one hardware processor comprising:
   a transmission waveform setting section configured to set a transmission signal in such a way that a frequency of the transmission signal is linearly changed;
   a transmitting section configured to transmit the transmission signal;
   a receiving section configured to receive a reception signal resulting from a reflection of the transmission signal at an object;
   a Doppler coefficient estimating section configured to estimate a Doppler coefficient associated with a movement of the object by performing arithmetic processing only on a waveform of the reception signal at a present time point and waveforms of the reception signal at one or more past time points, the one or more past time points being earlier than the present time point by one or more specified periods of time, without including the transmission signal; and
   an object detection section configured to detect the object based on the transmission signal, the Doppler coefficient, and the reception signal.

2. The moving object detection system according to claim 1, wherein the Doppler coefficient estimating section comprises:
   a signal storing section configured to store the reception signal therein;
   a time specifying section configured to specify the one or more specified periods of time;
   a signal multiplying section configured to obtain one or more multiplied signals by multiplying the reception signal at the present time point by a complex conjugate of each of one or more past signals, the one or more past signals being the reception signals at one or more past time points that are earlier than the present time point by one or more specified periods of time;
   a frequency calculating section configured to calculate one or more frequencies by performing frequency spectrum analysis of the one or more multiplied signals; and
   a Doppler coefficient calculating section configured to calculate the Doppler coefficient from the one or more frequencies.

3. The moving object detection system according to claim 1, wherein the Doppler coefficient estimating section comprises:
   a signal storing section configured to store the reception signal therein;
   a time specifying section configured to specify the one or more specified periods of time;
   a signal multiplying section configured to obtain one or more multiplied signals by multiplying the reception signal at the present time point by a complex conjugate of each of one or more past signals, the one or more past signals being the reception signals at one or more past time points that are earlier than the present time point by one or more specified periods of time;
   a signal differentiating section configured to obtain one or more differentiated signals by differentiating the one or more multiplied signals; and
   a Doppler coefficient calculating section configured to calculate the Doppler coefficient from ratios of the one or more multiplied signals to the one or more differentiated signals.

4. The moving object detection system according to claim 2, wherein the Doppler coefficient calculating section comprises a Doppler coefficient averaging section configured to average one or more of the Doppler coefficients.

5. The moving object detection system according to claim 2, wherein the Doppler coefficient calculating section comprises a Doppler coefficient smoothing section configured to smooth one or more of the Doppler coefficients.

6. The moving object detection system according to claim 3, wherein the Doppler coefficient calculating section comprises a Doppler coefficient averaging section configured to average one or more of the Doppler coefficients.

7. The moving object detection system according to claim 3, wherein the Doppler coefficient calculating section comprises a Doppler coefficient smoothing section configured to smooth one or more of the Doppler coefficients.

8. A moving object detection method comprising:
   setting a transmission signal whose frequency is linearly changed;
   receiving a reception signal resulting from a reflection of the transmission signal at an object;
   estimating a Doppler coefficient associated with a movement of the object by performing arithmetic processing only on a waveform of the reception signal at a present time point and waveforms of the reception signal at one or more past time points, the one or more past time points being earlier than the present time point by one or more specified periods of time, without including the transmission signal; and
   detecting the object based on the transmission signal, the Doppler coefficient, and the reception signal.

9. A non-transitory computer-readable recording medium storing a program that, if executed, causes a computer to execute:
   a process of setting a transmission signal whose frequency is linearly changed;
   a process of receiving a reception signal resulting from a reflection of the transmission signal at an object;
   a process of estimating a Doppler coefficient associated with a movement of the object by performing arithmetic processing only on a waveform of the reception signal at a present time point and waveforms of the reception signals at one or more past time points, the one or more past time points being earlier than the present time point by one or more specified periods of time, without including the transmission signal; and
   a process of detecting the object based on the transmission signal, the Doppler coefficient, and the reception signal.

10. The moving object detection system according to claim 1, wherein the moving object detection system is a sonar system.

11. The moving object detection system according to claim 10, wherein the transmitting section is a sonar transmitting section.

* * * * *